United States Patent
Lee et al.

(10) Patent No.: US 11,838,137 B2
(45) Date of Patent: Dec. 5, 2023

(54) METHOD AND DEVICE FOR PERFORMING UPLINK TRANSMISSION AND RECEPTION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/077,123

(22) Filed: Dec. 7, 2022

(65) Prior Publication Data

US 2023/0098546 A1    Mar. 30, 2023

Related U.S. Application Data

(63) Continuation of application No. PCT/KR2022/006731, filed on May 11, 2022.

(30) Foreign Application Priority Data

May 11, 2021 (KR) .................. 10-2021-0060588

(51) Int. Cl.
*H04L 1/1867* (2023.01)
*H04W 72/23* (2023.01)

(52) U.S. Cl.
CPC .......... *H04L 1/1887* (2013.01); *H04W 72/23* (2023.01)

(58) Field of Classification Search
CPC ....... H04L 5/0053; H04L 7/08; H04L 5/0023; H04L 5/0048; H04L 5/0094; H04W 72/23
See application file for complete search history.

(56) References Cited

U.S. PATENT DOCUMENTS

2020/0322921 A1    10/2020   Zhou et al.
2021/0266943 A1*   8/2021    Khoshnevisan ...... H04W 72/23
(Continued)

OTHER PUBLICATIONS

Moderator (Huawei), "FL summary#3 on improving reliability for MBS for RRC_Connected UEs", R1-2103929, 3GPP TSG RAN WG1 Meeting #104bis-e, E-meeting, Apr. 12-20, 2021, see sections 2.4.2, 2.5.1 and 2.7.2.
(Continued)

*Primary Examiner* — Chi Ho A Lee
*Assistant Examiner* — Andrew Lee
(74) *Attorney, Agent, or Firm* — BRYAN CAVE LEIGHTON PAISNER LLP

(57) ABSTRACT

Disclosed are a method and device for performing uplink transmission and reception in a wireless communication system. The method by which a terminal performs an uplink transmission, according to an embodiment of the present disclosure, comprises the steps of: receiving a first downlink transmission and a second downlink transmission from a base station; and transmitting, to the base station, first HARQ-ACK information associated with the first downlink transmission and second HARQ-ACK information associated with the second downlink transmission, which have been multiplexed on a PUCCH, wherein, on the basis of the first downlink transmission being a unicast SPS downlink transmission and the second downlink transmission being a multicast downlink transmission being scheduled by first DCI, a resource for the PUCCH may be based on information related to the unicast SPS downlink transmission.

5 Claims, 10 Drawing Sheets

(56) References Cited

U.S. PATENT DOCUMENTS

| | | | |
|---|---|---|---|
| 2021/0282114 A1* | 9/2021 | Liu | H04B 7/0695 |
| 2022/0232658 A1* | 7/2022 | Chen | H04W 76/25 |
| 2022/0278809 A1* | 9/2022 | Papasakellariou | H04L 1/1861 |
| 2022/0304041 A1* | 9/2022 | Fu | H04W 72/23 |
| 2022/0322313 A1* | 10/2022 | Zhang | H04W 4/06 |
| 2022/0322397 A1* | 10/2022 | Liu | H04L 1/1896 |
| 2022/0329390 A1* | 10/2022 | Zhang | H04L 1/1671 |
| 2022/0360950 A1* | 11/2022 | Li | H04L 1/1812 |
| 2023/0047407 A1* | 2/2023 | Li | H04W 4/06 |

OTHER PUBLICATIONS

ZTE, "Discussion on HARQ-ACK enhancements for eURLLC", R1-2102493, 3GPP TSG RAN WG1 Meeting #104b-e, e-Meeting, Apr. 12-20, 2021, see section 2.1.

ZTE, "Discussion on mechanisms to Improve Reliability for RRC_Connected UEs", R1-2102502, 3GPP TSG RAN WG1 #104b-e, e-Meeting, Apr. 12-20, 2021, see section 2.1.

Lenovo et al., "HARQ-ACK feedback enhancement for IIoT/URLLC", R1-2103610, 3GPP TSG RAN WG 1 #104bis-e, e-Meeting, Apr. 12-20, 2021, see sections 2.1-2.2.

* cited by examiner

METHOD AND DEVICE FOR PERFORMING UPLINK TRANSMISSION AND RECEPTION IN WIRELESS COMMUNICATION SYSTEM

CROSS-REFERENCE TO RELATED APPLICATIONS

This application is a Continuation Application of International Application No. PCT/KR2022/006731, filed on May 11, 2022, which claims the benefit of and priority to Korean Patent Application No. 10-2021-0060588, filed on May 11, 2021, the contents of which are all hereby incorporated by reference herein in their entirety.

TECHNICAL FIELD

The present disclosure relates to a wireless communication system, and in more detail, relates to an uplink transmission/reception method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide an uplink transmission/reception method and apparatus in a wireless communication system.

In addition, an additional technical problem of the present disclosure is to provide a method and apparatus for determining a PUCCH resource used when multiplexing and transmitting HARQ-ACK for unicast transmission and multicast transmission.

The technical problems to be achieved by the present disclosure are not limited to the above-described technical objects, and other technical problems which are not described herein will be clearly understood by those skilled in the pertinent art from the following description.

According to an embodiment of the present disclosure, it may include receiving, from a base station, a first downlink transmission and a second downlink transmission; and transmitting, to the base station, first hybrid automatic repeat request (HARQ)-acknowledgement (ACK) information associated with the first downlink transmission and second HARQ-ACK information associated with the second downlink transmission multiplexed on a physical uplink control channel (PUCCH), based on the first downlink transmission being a unicast semi-persistent scheduling (SPS) downlink transmission and the second downlink transmission being a multicast downlink transmission scheduled by first downlink control information (DCI), a resource for the PUCCH may be based on information related to the unicast SPS downlink transmission.

In another embodiment of the present disclosure, a method for performing uplink reception by a base station in a wireless communication system may include transmitting, to a user equipment (UE), a first downlink transmission and a second downlink transmission; and receiving, from the UE, first hybrid automatic repeat request (HARQ)-acknowledgement (ACK) information associated with the first downlink transmission and second HARQ-ACK information associated with the second downlink transmission multiplexed on a physical uplink control channel (PUCCH), based on the first downlink transmission being a unicast semi-persistent scheduling (SPS) downlink transmission and the second downlink transmission being a multicast downlink transmission scheduled by first downlink control information (DCI), a resource for the PUCCH may be based on information related to the unicast SPS downlink transmission.

According to an embodiment of the present disclosure, an uplink transmission/reception method and apparatus may be provided in a wireless communication system.

In addition, according to an embodiment of the present disclosure, a method and apparatus for determining a PUCCH resource used when multiplexing and transmitting HARQ-ACK for unicast transmission and multicast transmission may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
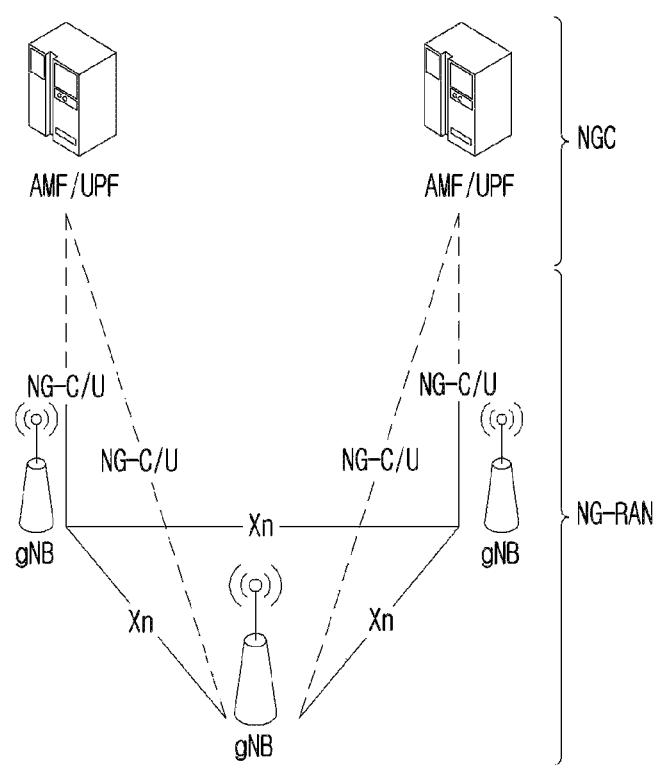
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
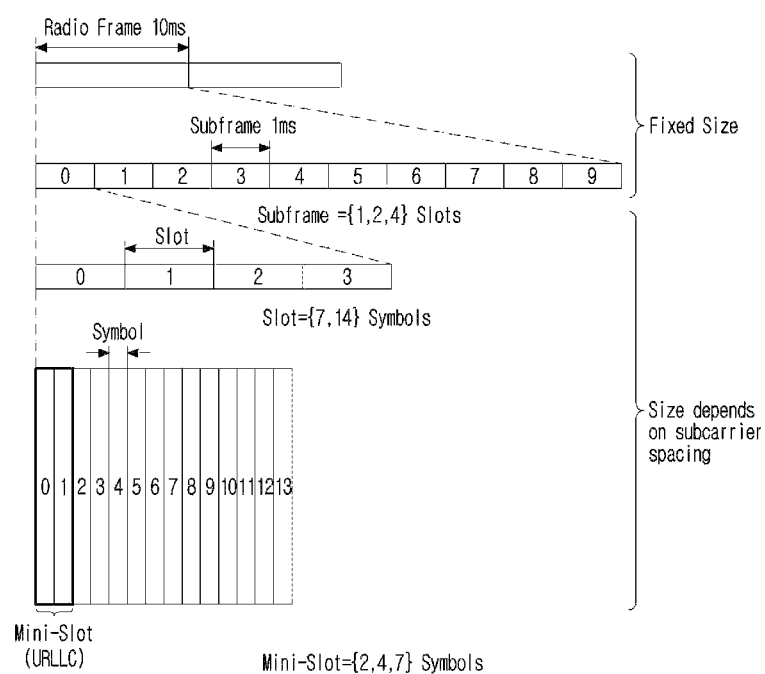
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}==(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_A=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
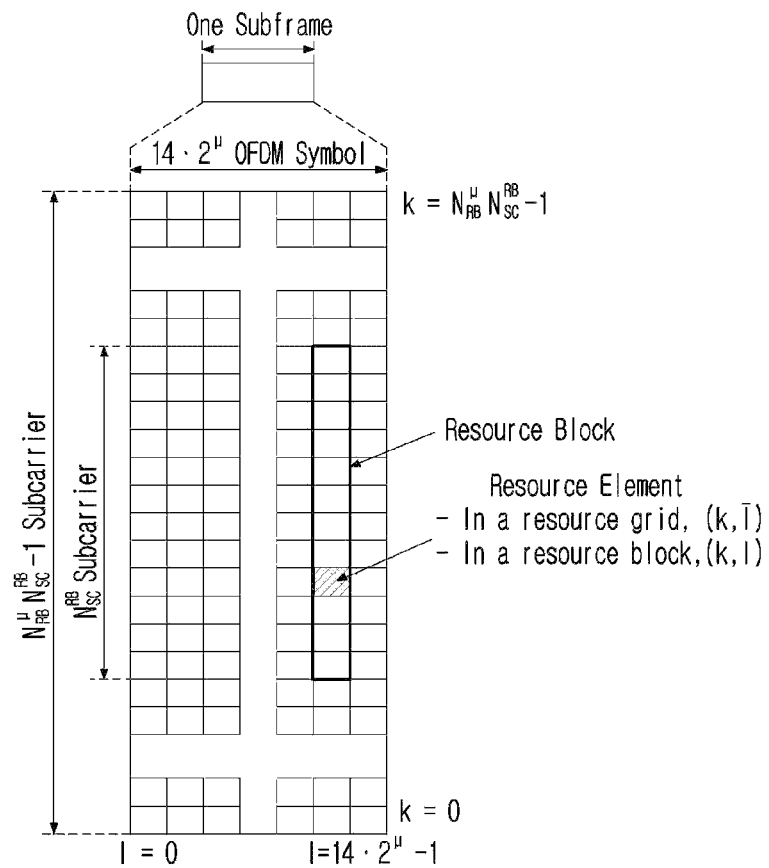
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in an NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad \text{[Equation 2]}$$

$N_{BWP,i}^{start,\mu}$ is a common resource block that a BWP starts relatively to common resource block 0.

Figure 4:
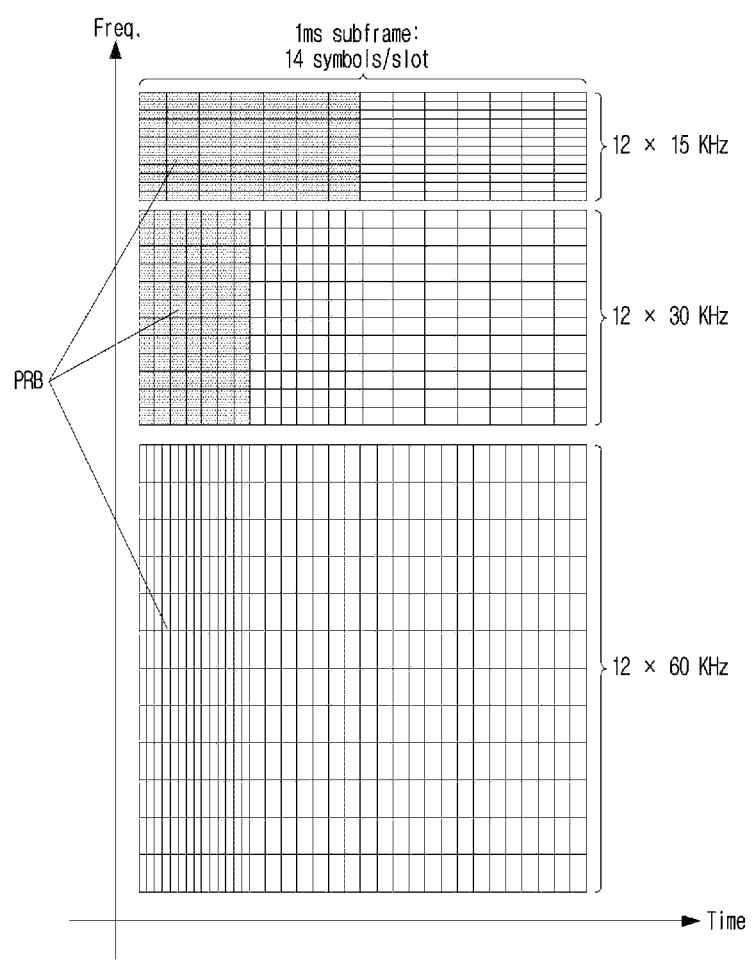
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
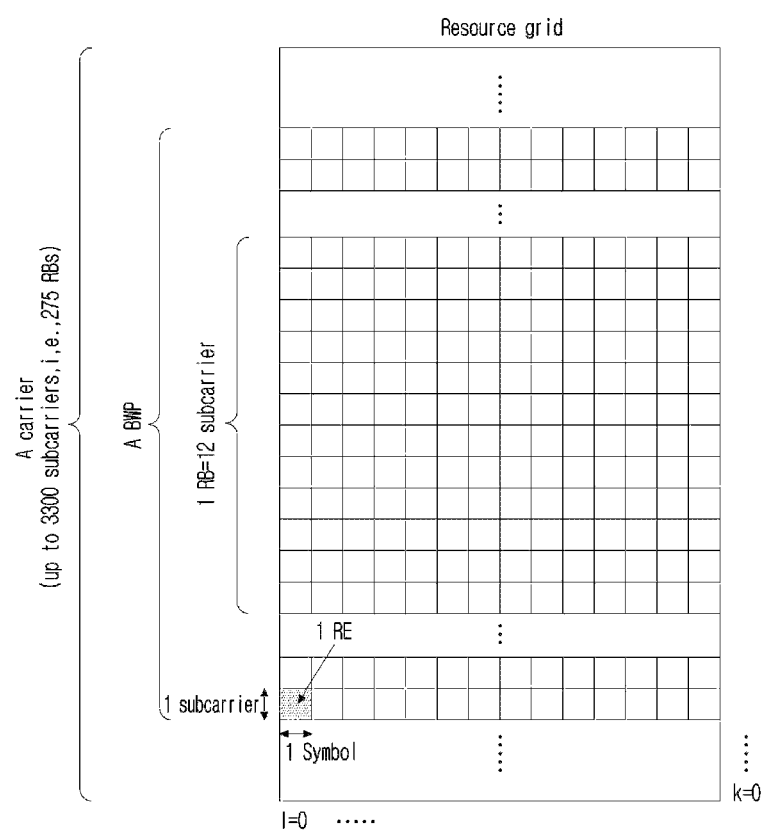
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
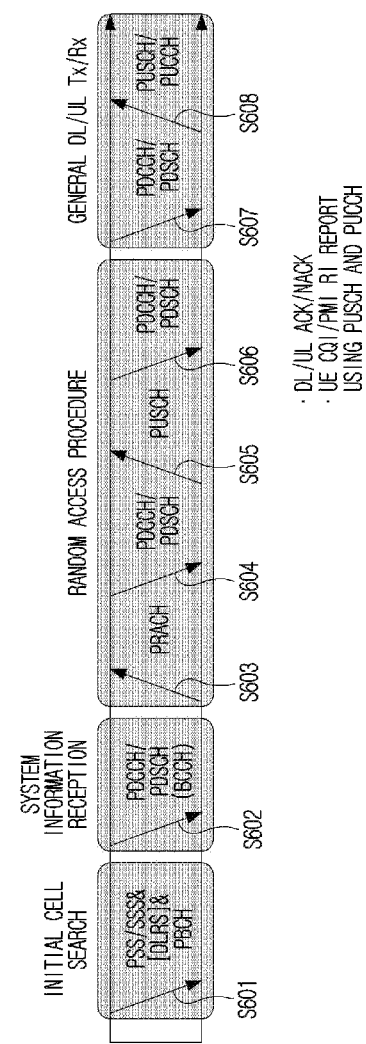
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted. Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined. DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast/Multicast Service) Scheme

Hereinafter, the MBMS scheme of 3GPP LTE will be described. MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

Here, SFN scheme may be used to provide a broadcast service to a wide area (e.g., MBMS area) through resources allocated semi-statically in advance, and SC-PTM scheme may be mainly used to provide a broadcast service only within a cell coverage through dynamic resources.

SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting SC-MCCH or SC-MTCH data may be scheduled through a PDCCH indicated by a Group Radio Network Temporary Identifier (G-RNTI).

In this case, a temporary mobile group identify (TMGI) corresponding to the service ID may be mapped one-to-one with a specific G (group)-RNTI value. Accordingly, when the base station provides a plurality of services, a plurality of G-RNTI values may be allocated for SC-PTM transmission. One or a plurality of terminals may perform PDCCH monitoring by using a specific G-RNTI to receive a specific service.

And, for a specific service/specific G-RNTI, SC-PTM dedicated DRX on-duration section may be configured, and in this case, the UEs may wake up only for a specific on-duration period and perform PDCCH monitoring for the G-RNTI.

MBS (Multicast Broadcast Service) Based Transmission/Reception Operation

In a basic wireless communication system, the base station sets terminal-specific SPS (semi-persistent scheduling) configuration information to a specific terminal, so that a downlink (DL) SPS transmission resource that is repeated according to a configured period may be allocated to a specific terminal. In this case, the DCI transmitted through the terminal-dedicated PDCCH indicates activation of a specific SPS configuration index (SPS activation), thereby instructing the corresponding terminal to repeatedly receive the SPS transmission resource according to a configured period.

This initial SPS transmission resource may be used for initial HARQ transmission, and the base station may allocate a retransmission resource of a specific SPS configuration index through DCI transmitted through a terminal-dedicated PDCCH. For example, when the terminal reports a HARQ negative acknowledgment (NACK) for the SPS transmission resource, the base station may allocate the retransmission resource to DCI so that the terminal may receive the DL retransmission.

And, the DCI transmitted through the terminal-dedicated PDCCH may indicate deactivation (SPS release or SPS deactivation) of a specific SPS configuration index, and in this case, the corresponding terminal may not receive the indicated SPS transmission resource. Here, the CRC of the DCI for the activation/retransmission/deactivation may be scrambled with a CS-RNTI (Configured Scheduling RNTI).

In a wireless communication system (e.g., NR), a DL broadcast or DL multicast transmission scheme for supporting an MBS similar to the above-described MBMS may be applied. The base station may provide a point-to-multipoint (PTM) transmission scheme and a point-to-point (PTP) transmission scheme for DL broadcast or DL multicast transmission.

In the PTM transmission method for MBS, the base station may transmit a group common PDCCH and a group common PDSCH to a plurality of terminals, and a plurality of terminals may simultaneously receive the same group common PDCCH and group common PDSCH transmission and decode the same MBS data.

In addition, in the PTP transmission method for MBS, the base station may transmit the terminal-dedicated PDCCH and the terminal-dedicated PDSCH to a specific terminal, and only the corresponding terminal may receive the terminal-dedicated PDCCH and the terminal-dedicated PDSCH. Here, when there are a plurality of terminals receiving the same MBS service, the base station may separately transmit the same MBS data to individual terminals through different terminal-dedicated PDCCHs and terminal-dedicated PDSCHs.

For application of MBS, group common SPS transmission may be supported. Accordingly, the terminal may receive group common SPS transmission (i.e., static scheduling transmission) and group common dynamic scheduling transmission (dynamically scheduled transmission). In addition, the terminal may receive a group common SPS transmission and a static/dynamic scheduling transmission dedicated to the terminal. In this case, the UE may transmit the HARQ-ACK for the transmissions in the same slot or sub-slot.

For example, PUCCH resource(s) for group common/terminal dedicated SPS and PUCCH resource(s) for group common/terminal dedicated dynamic scheduling transmission may be allocated to the same slot or the same sub-slot. In this case, HARQ-ACK transmissions for two or more transmissions may be multiplexed and transmitted on one PUCCH. At this time, when HARQ-ACKs are transmitted (via PUCCH resources) in the same slot/sub-slot for a plurality of group common transmissions or a plurality of group common/terminal dedicated transmissions, there is a problem that the criterion for selecting the corresponding PUCCH resource is not clear.

HARQ-ACK Transmission Method for a Plurality of Group Common Transmission and/or Terminal-Dedicated Transmission The present disclosure, in order to solve the above-described problem, when HARQ-ACKs for a plurality of group common transmissions or a plurality of group common terminal dedicated transmissions are transmitted in the same slot/sub-slot, a method of multiplexing corresponding HARQ-ACKs by selecting one PUCCH resource will be described.

Figure 7:
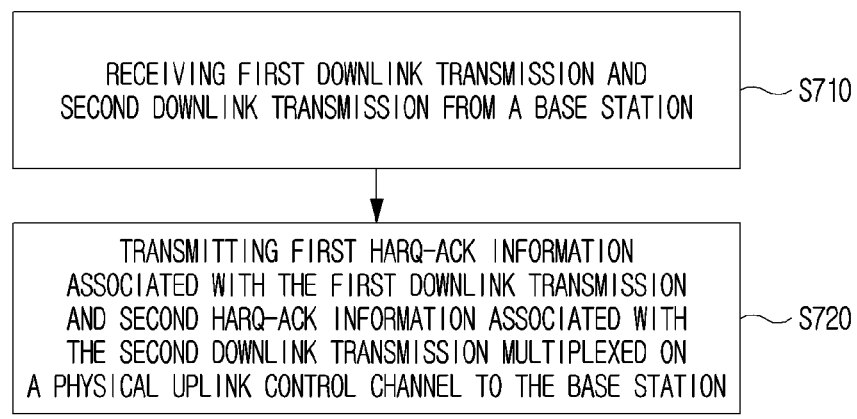
FIG. 7 is a diagram for describing an uplink transmission method of a terminal according to an embodiment of the present disclosure.

FIG. 7 is a diagram for describing a method for a terminal to perform uplink transmission according to an embodiment of the present disclosure.

In describing the present disclosure, downlink transmission may include at least a physical downlink shared channel (PDSCH).

The terminal may receive the first downlink transmission and the second downlink transmission from the base station (S710). The timing at which each of the first downlink transmission and the second downlink transmission is received from the base station may be implemented in various ways. For example, the terminal may receive the second downlink transmission after receiving the first downlink transmission, but may also receive it conversely.

The terminal may transmit first HARQ (hybrid automatic repeat request)-ACK (acknowledgement) information associated with the first downlink transmission and second HARQ-ACK information associated with the second downlink transmission multiplexed on the physical uplink control channel (PUCCH) to the base station (S720).

As an example, based on the first downlink transmission being a unicast semi-persistent scheduling (SPS) downlink transmission and the second downlink transmission being a multicast downlink transmission scheduled by the first downlink control information (DCI), resources for the PUCCH (i.e., PUCCH resources) may be based on information related to the unicast SPS downlink transmission.

In this case, the first DCI may be expressed as a multicast DCI (or DCI scrambled by CRC by G-RNTI or G-CS-RNTI), and the second HARQ-ACK information may be associated with the multicast DCI.

And, the information related to the unicast SPS downlink transmission may include information related to one or more PUCCH resources for HARQ-ACK of the unicast SPS downlink transmission.

In addition, information related to unicast SPS downlink transmission may be transmitted from the base station to the terminal through an RRC message. For example, the RRC message may include 'sps-PUCCH-AN-List', but is not limited thereto.

As another example, based on the first downlink transmission being a multicast SPS downlink transmission and the second downlink transmission being a multicast downlink transmission scheduled by the first DCI, resources for the PUCCH may be based on the last DCI.

In this case, the first DCI may be expressed as a multicast DCI, and the second HARQ-ACK information may be associated with the multicast DCI. And, the resource for PUCCH may include a resource indicated by a PUCCH resource indicator (PRI) of the last DCI.

As another example, based on the first downlink transmission being a unicast SPS downlink transmission and the second downlink transmission being a unicast downlink transmission scheduled by the second DCI, resources for PUCCH may include resources indicated by PRI of the last DCI.

Here, the second DCI may be expressed as a unicast DCI or a DCI scrambled by CRC by C-RNTI, CS-RNTI, or MCS-C-RNTI.

As another example, based on the first downlink transmission being the unicast SPS downlink transmission and the second downlink transmission being a multicast SPS downlink transmission, resources for PUCCH may be determined based on PUCCH resources for HARQ-ACK information associated with the SPS transmission.

Figure 8:
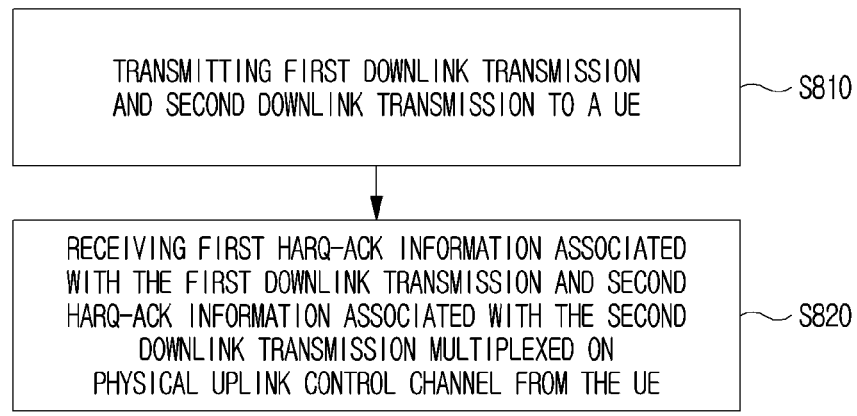
FIG. 8 is a diagram for describing an uplink reception method of a base station according to an embodiment of the present disclosure.

FIG. 8 is a diagram for describing a method of performing uplink reception of a base station according to an embodiment of the present disclosure.

The base station may transmit the first downlink transmission and the second downlink transmission to the terminal (S810).

The base station may receive first HARQ-ACK information associated with the first downlink transmission and second HARQ-ACK information associated with the second downlink transmission multiplexed on the PUCCH from the terminal (S820).

Regarding first downlink transmission, second downlink transmission, first HARQ-ACK information, second HARQ-ACK information, and an uplink transmission and reception method based thereon, details described with reference to steps S710 to S730 of FIG. 7 and specific examples to be described later may be applied to steps S810 to S830. Accordingly, redundant descriptions will be omitted.

Hereinafter, when HARQ-ACKs for a plurality of group common transmissions or a plurality of group common/dedicated transmissions are transmitted in the same slot/subslot, a method of multiplexing HARQ-ACKs by selecting one PUCCH resource will be described in detail.

Embodiment 1

For group common SPS PDSCH (scheduled by RRC rather than DCI), the group common PUCCH resource used for NACK-only based HARQ-ACK may be semi-persistently configured for one or more group common SPS configurations.

Alternatively, UE-specific PUCCH resources for ACK/NACK-based HARQ-ACK may be configured for one or more group common SPS configurations. Alternatively, the group common PUCCH resource for ACK and the group common PUCCH resource for NACK may be separately configured for one or more group common configurations.

Here, different SPS configurations may be configured with the same PUCCH resource or different PUCCH resources.

For example, when the same PUCCH resource is allocated for different SPS PDSCHs of different SPS configurations, one HARQ-ACK bit may indicate ACK or NACK for all SPS PDSCHs, or different HARQ-ACK bits may indicate ACK or NACK for different SPS PDSCHs, respectively.

For example, when one HARQ-ACK bit indicates ACK or NACK for all SPS PDSCHs, the UE may indicate ACK when all SPS PDSCHs are successfully received. And, if one or more of the SPS PDSCHs are not successfully received, the UE may indicate NACK.

As another example, when different PUCCH resources are allocated for different SPS PDSCHs of different SPS configurations, different HARQ-ACK resources may indicate ACK or NACK for different SPS PDSCHs, respectively.

And, if the PUCCH resource is not explicitly configured for 'SPS configuration index=N', the UE may determine that the PUCCH resource for 'SPS configuration index=N−k (or N+k)' may be used as the PUCCH resource for 'SPS configuration index=N'. In this case, k may be 1 or another integer.

Alternatively, if there is no PUCCH resource explicitly configured for 'SPS configuration index=N', the UE may determine that HARQ-ACK is disabled for the SPS PDSCH of 'SPS configuration index=N'.

If 'PUCCH-config' for multicast is configured, the UE may determine the PUCCH resource for the group common SPS configuration index (s) based on 'PUCCH-config' for multicast and the UE may determine the PUCCH resource for the UE-specific SPS configuration index (s) based on 'PUCCH-config' for unicast.

If 'PUCCH-config' for multicast is not configured, the UE may determine that the PUCCH resource for the group common SPS configuration index (s) is determined based on 'PUCCH-config' for unicast.

As another example, for group common SPS retransmission, PUCCH resources may be allocated by DCI scrambled CRC by G-CS-RNTI. When determining the PUCCH resource, the UE may regard the group common SPS retransmission as a group common PDSCH scheduled by DCI.

Here, when 'PUCCH-config' for multicast is configured, the UE may determine that PUCCH resources for group common SPS retransmission are determined based on 'PUCCH-config' for multicast.

If 'PUCCH-config' for multicast is not configured, the UE may determine that the PUCCH resource for group common SPS retransmission is determined based on 'PUCCH-config' for unicast.

And, when determining the PUCCH resource, the UE may regard the corresponding SPS retransmission as a unicast PDSCH (or group common PDSCH).

As another example, for UE-specific SPS retransmission of TB initially transmitted by group common SPS PDSCH, PUCCH resources may be allocated by DCI scrambled CRC by CS-RNTI. When determining the PUCCH resource, the UE may regard the corresponding UE-specific SPS retransmission as a unicast PDSCH. Alternatively, when determining the PUCCH resource, the UE may regard the corresponding UE-specific SPS retransmission as a group common PDSCH scheduled by DCI.

Here, if 'PUCCH-config' for multicast is configured, the UE may determine that PUCCH resources for group common SPS retransmission are determined based on 'PUCCH-config' for multicast.

Alternatively, even if 'PUCCH-config' for multicast is configured, the UE may determine a PUCCH resource for group common SPS retransmission based on 'PUCCH-config' for unicast.

If 'PUCCH-config' for multicast is not configured, the UE may determine that the PUCCH resource for group common SPS retransmission is determined based on 'PUCCH-config' for unicast.

As another example, either NACK-based HARQ-ACK or UE-specific ACK/NACK-based HARQ-ACK may be used for SPS PDSCH retransmission.

In the present disclosure, the priority of the SPS configuration or the priority of the HARQ-ACK for the SPS PDSCH may be determined based on the 'harq-CodebookID' of the SPS configuration configured in 'SPS-config' by the RRC message. In the case of PUCCH transmission including HARQ-ACK information corresponding to SPS PDSCH reception or SPS PDSCH release, the UE may determine the priority index from 'harq-CodebookID' (if provided). Here, 'harq-CodebookID' may indicate HP (high priority) or LP (low priority) for the SPS configuration.

Embodiment 2

As another example, for group common SPS retransmission, PUCCH resources may be allocated by DCI scrambled CRC by G-CS-RNTI. When determining the PUCCH resource, the UE may regard the group common SPS retransmission as a group common PDSCH scheduled by DCI.

Here, when 'PUCCH-config' for multicast is configured, the UE may determine that PUCCH resources for group common SPS retransmission are determined based on 'PUCCH-config' for multicast.

If 'PUCCH-config' for multicast is not configured, the UE may determine that the PUCCH resource for group common SPS retransmission is determined based on 'PUCCH-config' for unicast.

And, when determining the PUCCH resource, the UE may regard the corresponding SPS retransmission as a unicast PDSCH (or group common PDSCH).

As another example, for UE-specific SPS retransmission of TB initially transmitted by group common SPS PDSCH, PUCCH resources may be allocated by DCI scrambled CRC by CS-RNTI. When determining the PUCCH resource, the UE may regard the corresponding UE-specific SPS retransmission as a unicast PDSCH. Alternatively, when determining the PUCCH resource, the UE may regard the corresponding UE-specific SPS retransmission as a group common PDSCH scheduled by DCI.

Here, when 'PUCCH-config' for multicast is configured, the UE may determine that PUCCH resources for group common SPS retransmission are determined based on 'PUCCH-config' for multicast.

Alternatively, even if 'PUCCH-config' for multicast is configured, the UE may determine a PUCCH resource for group common SPS retransmission based on 'PUCCH-config' for unicast.

If 'PUCCH-config' for multicast is not configured, the UE may determine that the PUCCH resource for group common SPS retransmission is determined based on 'PUCCH-config' for unicast.

As another example, either NACK-based HARQ-ACK or UE-specific ACK/NACK-based HARQ-ACK may be used for SPS PDSCH retransmission.

Embodiment 3

For PUCCH multiplexing HARQ-ACK(s) for dynamically scheduled multicast PDSCH and dynamically scheduled unicast PDSCH(s), or for PUCCH transmissions multiplexing HARQ-ACK(s) only to dynamically scheduled multicast PDSCH(s), the UE may determine a PUCCH resource based on a PUCCH resource indicator (PRI) of a last DCI for scheduling multicast or unicast among high priority (HP) DCIs.

For PUCCH transmission multiplexing HARQ-ACK(s) on dynamically scheduled PDSCH(s) and/or SPS PDSCH(s) for both multicast and unicast or only for multicast, the UE may determine the PUCCH resource based on one or more of the following options.

As option 1, PUCCH resources may be determined based on the PRI of the last DCI scheduling PDSCH among all unicast/multicast PDSCH(s) or all unicast PDSCH(s).

Option 1 may be applied depending on whether 'PUCCH-config' is set for multicast. Option 1 may be applied based on the PDSCH with HP.

As option 2, a PUCCH resource allocated to a dynamically scheduled or semi-statically scheduled unicast PDSCH may be determined.

As option 3, a PUCCH resource allocated to a PDSCH corresponding to HP may be determined.

As option 4, the PUCCH resource allocated to the lowest (or highest) PUCCH resource ID can be determined.

As option 5, the PUCCH resource allocated by the lowest (or highest) PRI among all DCIs scheduling the PDSCH may be determined.

For PUCCH transmission multiplexing HARQ-ACK(s) for multicast SPS PDSCH and unicast SPS PDSCH and/or HARQ-ACK(S) for multicast SPS PDSCH(s), the UE may determine the PUCCH resource based on one of the following options.

As option 1, PUCCH resources allocated to the lowest (or highest) SPS configuration index may be determined.

As option 2, a PUCCH resource allocated to an SPS configuration index having an HP or highest priority among all PDSCHs may be determined.

As option 3, the PUCCH resource allocated to the lowest (or highest) PUCCH resource ID can be determined.

As option 4, unicast SPS configurations may be determined, and as option 5, multicast SPS settings may be determined.

In the present disclosure, the priority of SPS configuration or the priority of HARQ-ACK for SPS PDSCH may be determined based on 'harq-CodebookID' of SPS configuration configured in 'SPS-config' by RRC message. In the case of PUCCH transmission including HARQ-ACK information corresponding to SPS PDSCH reception or SPS PDSCH release, the UE may determine the priority index from 'harq-CodebookID' (if provided). 'harq-CodebookID' may indicate HP or LP for SPS configurations.

Embodiment 4

HARQ feedback enabling/disabling for group common SPS configuration may be indicated by (re)activation, retransmission or release DCI of SPS configuration, group common MAC CE, or UE specific MAC CE.

MAC CE may be composed of one or more of the following information (information 1) to 4) below.

HARQ feedback enabling/disabling indicator for one or more G-RNTI/TMGI.

According to the indicator, the UE may enable/disable HARQ feedback for the group common PDSCH of the group common SPS configuration corresponding to G-RNTI(s)/TMGI(s).

2) HARQ Feedback Enabling/Disabling Indicator for One or More SPS Configuration Indexes.

According to the indicator, the UE may enable/disable HARQ feedback for the group common PDSCH of the group common SPS configuration(s).

3) HARQ Feedback Enabling/Disabling Indicator for One or More G-CS-RNTI/CS-RNTI.

According to the indicator, the UE may enable/disable HARQ feedback for the group common PDSCH scheduled by DCI whose CRC is scrambled by G-CS-RNTI(s)/CS-RNTI(s).

4) HARQ Feedback Enabling/Disabling Indicators for One or More PUCCH Resource Indicators (PRIs) or One or More PUCCH Resource IDs.

According to the indicator, the UE may enable/disable HARQ feedback for the group common PDSCH scheduled by DCI indicating PRI(s).

Alternatively/additionally, according to the indicator, the UE may enable/disable HARQ feedback for PUCCH resource ID(s).

MAC CE may be group common or UE specific.

For example, upon receiving a group common MAC CE enabling/disabling HARQ feedback for a group common SPS PDSCH, the UE may enable/disable HARQ feedback for a group common PUCCH resource for a group common SPS PDSCH according to information included in the MAC CE, or/and the UE may enable/disable HARQ feedback for any PUCCH resource for the group common SPS PDSCH according to information included in the MAC CE.

As another example, upon receiving a UE-specific MAC CE enabling/disabling HARQ feedback for a group common SPS PDSCH, the UE may enable/disable HARQ feedback for UE-specific PUCCH resources for group common SPS PDSCH according to information included in MAC CE, and/or the UE may enable/disable HARQ feedback for any PUCCH resource for the group common SPS PDSCH according to information included in the MAC CE.

As another example, when receiving MAC CE enabling/disabling HARQ feedback for a group common SPS PDSCH, the UE may enable/disable HARQ feedback 1) immediately after processing a MAC CE or sending an ACK to a MAC CE, or/and 2) in the Kth slot (K is an integer determined by the network side or UE capability) after receiving the MAC CE or sending the ACK to the MAC CE, or/and 3) on the next SPS PDSCH after receiving a MAC CE or sending an ACK to the MAC CE, 4) on the next SPS retransmission after receiving a MAC CE or sending an ACK to the MAC CE.

Hereinafter, a method in which a base station configures a group common SPS configuration for one or a plurality of UEs and the base station and the UE perform group common SPS transmission and reception will be described.

Figure 9:
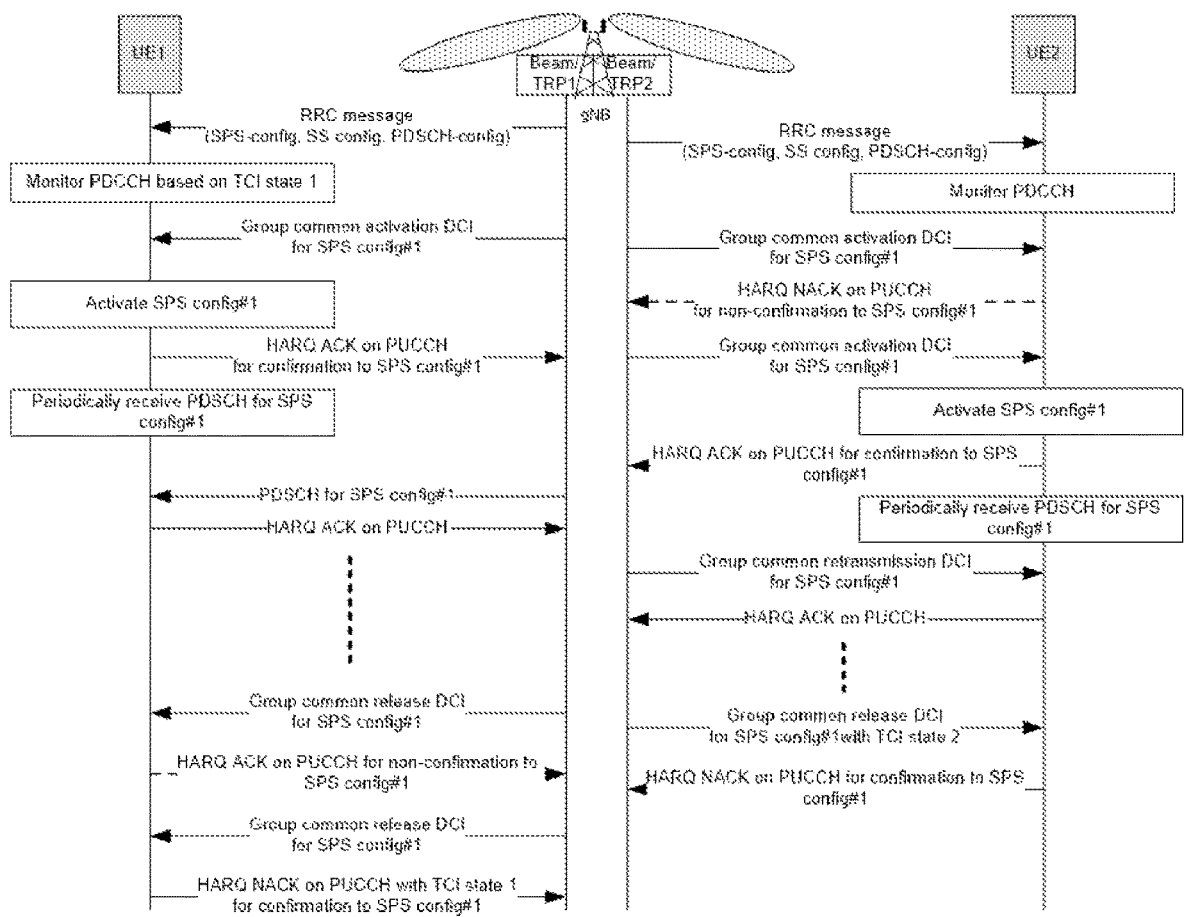
FIG. 9 is a diagram for describing a signaling procedure of a network side and a terminal according to the present disclosure.

FIG. 9 is a diagram for describing a signaling procedure of a network side and a UE according to an embodiment of the present disclosure.

FIG. 9 shows an example of signaling between a network side and a terminal (UE) in an M-TRP environment (or S-TRP environment) to which embodiments (e.g., embodiment 1, embodiment 2, embodiment 3, embodiment 4 or a combination of one or more of the detailed embodiments thereof) of the present disclosure described above may be applied.

Here, the UE/network side is exemplary, and may be replaced with various devices to be described with reference to FIG. 10. FIG. 9 is for convenience of description, and does not limit the scope of the present disclosure. Also, some step(s) shown in FIG. 9 may be omitted depending on circumstances and/or settings. In addition, in the operation of the network side/UE of FIG. 9, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side. Here, the message may be reported to the network side through at least one of Uplink Control Information (UCI), Control Element (MAC CE), and RRC messages.

The MBS service of interest on the message may indicate either TMGI or G-RNTI (Group Radio Network Temporary Identifier) listed in a DL message received from the network side. G-RNTI indicates the terminal group identifier for receiving the MBS.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

The network side receiving the message may provide a common frequency resource (CFR) configuration, one or more group common SPS configuration including a TCI state, a search space configuration including a TCI state, and a GC (group common)-CS-RNTI value to the UE (e.g., UE 1 and UE 2) through the RRC message (S910). Upon receiving the RRC message, the UE may configure one or more group common SPS configurations according to the RRC message.

Here, the RRC message may be a group common message transmitted through a PTM MCCH (Multicast Control Channel) or a UE-dedicated message transmitted through a UE-specific DCCH (Dedicated Control Channel).

In addition, The UE may be configured with at least a G-RNTI value for each MBS CFR or each serving cell. GC-CS-RNTI may be configured/used for activation, retransmission or release of one or more group common SPS configurations.

For example, when the UE is not configured with GC-CS-RNTI for CFR or serving cell, and CS-RNTI is configured for CFR or serving cell, the UE may use CS-RNTI for activating, retransmitting, or releasing of one or more group common SPS configurations.

As another example, the network side may associate one GC-CS-RNTI value with a TMGI list or a G-RNTI list. In this case, the network side may provide a TMGI list or a G-RNTI list associated with the GC-CS-RNTI value.

Each group common SPS configuration (i.e., SPS-config) may be set as the following information element as shown in Table 6 below.

TABLE 6

SPS-Config ::= SEQUENCE {
periodicity ENUMERATED {ms10, ms20, ms32, ms40, ms64, ms80, ms128, ms160, ms320, ms640,
spare6, spare5, spare4, spare3, spare2, spare1},
nrofHARQ-Processes INTEGER (1..8),
n1PUCCH-AN PUCCH-ResourceId OPTIONAL, -- Need M
mcs-Table ENUMERATED {qam64LowSE} OPTIONAL, -- Need S
sps-ConfigIndex-r16 SPS-ConfigIndex-r16 OPTIONAL, -- Cond SPS-List TABLE 6-continued

```
harq-ProcID-Offset-r16 INTEGER (0..15) OPTIONAL, -- Need R
periodicityExt-r16 INTEGER (1..5120) OPTIONAL, -- Need R
harq-CodebookID-r16 INTEGER (1..2) OPTIONAL, -- Need R
pdsch-AggregationFactor-r16 ENUMERATED {n1, n2, n4, n8 }
OPTIONAL -- Need S
   tci-StatesToAddModList SEQUENCE (SIZE(1..maxNrofTCI-States))
OF TCI-State OPTIONAL, -- Need N tci-StatesToReleaseList
SEQUENCE (SIZE(1..maxNrofTCI-States)) OF TCI-StateId
OPTIONAL, -- Need N
   GC-CS-RNTI RNTI-Value OPTIONAL, -- Need R}
```

Here, 'harq-CodebookID' may indicate the corresponding HARQ-ACK codebook for the SPS PDSCH and the HARQ-ACK codebook index for the ACK for the SPS PDSCH release. 'harq-ProcID-offset' may indicate an offset used to derive the HARQ process ID.

'mcs-table' may indicate an MCS table to be used by the UE for DL SPS. If the 'mcs-table' field is present, the UE must use the MCS table of the low-SE 64QAM table. If the corresponding field does not exist, the field 'mcs-table' of the 'PDSCH-Config' is configured to 'qam256', and the format of the active DCI is 1_1, the UE may apply the 256QAM table. Otherwise, the UE may apply a non-low-SE 64QAM table.

'n1PUCCH-AN' may mean a HARQ resource for PUCCH for DL SPS. The network side may configure the resource in format 0 or format 1. The actual PUCCH-resource is set in 'PUCCH-Config' and may be referred to as an ID.

'nrofHARQ-process' may indicate the number of HARQ processes configured for SPS DL.

'pdsch-AggregationFactor' may indicate the number of repetitions of the SPS PDSCH. If there is no corresponding field, the UE may apply a PDSCH aggregation factor of 'PDSCH-Config'.

'periodicity' may indicate the period of the DL SPS.

'periodicityExt' may be used to calculate the periodicity of the DL SPS. If the corresponding field exists, the 'periodicity' field may be ignored.

The following cycle may be supported according to the configured SCS[ms].

15 kHz: 'periodicityExt', where 'periodityExt' may have a value between 1 and 640.

30 kHz: 0.5×'periodicityExt', where 'periodicityExt' may have a value between 1 and 1280.

60 kHz in normal CP: 0.25×'periodicityExt', where 'periodityExt' may have a value between 1 and 2560.

60 kHz (including ECP): 0.25×'periodicityExt', where 'periodityExt' may have a value between 1 and 2560.

120 kHz: 0.125×'periodicityExt', where 'periodityExt' may have a value between 1 and 5120.

'sps-ConfigIndex' may indicate one index among multiple SPS configurations.

'tci-StatesToAddModList' may indicate a TCI state list indicating a transmission configuration including a QCL relationship between a DL RS and a PDSCH DMRS port in one RS set.

'GC-CS-RNTI' may indicate a GC-CS-RNTI value associated with 'sps-ConfigIndex'. If the corresponding field does not exist and another GC-CS-RNTI value is configured for the CFR or serving cell related to 'sps-ConfigIndex', the UE may use a different GC-CS-RNTI value for 'sps-ConfigIndex'. If the corresponding field does not exist and no other GC-CS-RNTI value is configured for the serving cell or CFR related to 'sps-ConfigIndex', the UE may use the CS-RNTI value for 'sps-ConfigIndex'.

For example, one or more SPS configurations may be configured and associated with a TCI state list (e.g., 'tci-StatesToAddModList' in 'SPS-config' for CFR). For one or more CFRs, different SPS configurations may be configured and associated with other 'tci-StatesToAddModList' in 'SPS-config'. If the group common SPS configuration is not configured to 'tci-StatesToAddModList' in 'SPS-config', the SPS configuration may be associated with 'tci-StatesToAddModList' in 'PDSCH-config' of the CFR or the serving cell of the UE.

Here, when 'tci-StatesToAddModList' is not configured as the SPS configuration index in 'SPS-config', the SPS configuration index may be a UE-specific SPS configuration rather than a group common SPS configuration used for MBS. That is, if 'tci-StatesToAddModList' is not configuration as the SPS configuration index in 'SPS-config', the UE may consider that the SPS configuration is a UE-specific SPS configuration rather than a group common SPS configuration. If 'tci-StatesToAddModList' is configuration as an SPS configuration index in 'SPS-config', the UE may consider that the SPS configuration is a group common SPS configuration.

As another example, one or more TMGIs may be configured and associated with 'tci-StatesToAddModList'. If the SPS PDSCH transmission of the SPS configuration is mapped to the TMGI associated with 'tci-StatesToAddModList', the SPS PDSCH transmission of the SPS configuration may be associated with the 'tci-StatesToAddModList'.

As another example, one or more G-RNTIs may be configured and associated with 'tci-StatesToAddModList'. When SPS PDSCH transmission of SPS configuration is mapped to MBS service of G-RNTI associated with 'tci-StatesToAddModList', SPS PDSCH transmission of SPS configuration may be associated with 'tci-StatesToAddModList'.

As another example, a value of GC-CS-RNTI or CS-RNTI may be configured and associated with 'tci-StatesToAddModList'. When the SPS configuration is mapped to a value of GC-CS-RNTI or CS-RNTI associated with 'tci-StatesToAddModList', the SPS configuration may be associated with 'tci-StatesToAddModList'.

As another example, one SPS configuration may configured one or more HARQ process IDs up to 'nrofHARQ-Processes' (up to 'nrofHARQ-Processes'). The HARQ process ID may be associated with a slot from which DL SPS PDSCH transmission starts and is derived from one of Equations 3 and 4 below.

$$\text{HARQ process ID}=[\text{floor}(\text{CURRENT\_slot} \times 10/(\text{numberOfSlotsPerFrame} \times \text{periodicity}))] \text{modulo nrofHARQ-Processes} \qquad \text{[Equation 3]}$$

$$\text{HARQ process ID}=[\text{floor}(\text{CURRENT\_slot} \times 10/(\text{numberOfSlotsPerFrame} \times \text{periodicity}))] \text{modulo nrofHARQ-Processes}+\text{harq-ProcID-Offset} \qquad \text{[Equation 4]}$$

As another example, the UE may be configured separately with one or more UE-specific SPS configuations.

As option 2-1, both the UE-specific SPS configuration and the group common SPS configuration may share the 'sps-ConfigIndex' value. For example, 'sps-ConfigIndex' may be configured from 0 to 4 for five UE-specific SPS configurations, but 'sps-ConfigIndex' may be configured from 7 to 8 for two group common SPS configurations. In this case, 'sps-ConfigIndex' values 5 and 6 may not be used for the UE.

In the above option, upon receiving the DCI for the SPS configuration, the UE may determine whether the SPS configuration is group common or UE specific by checking the 'sps-ConfigIndex' value included in the DCI. In DCI, the value of 'sps-ConfigIndex' may be indicated by a HARQ process number field or a configuration index field of DCI.

As option 2-2, the UE-specific SPS configuration and the group common SPS configuration may have a separate space for the 'sps-ConfigIndex' value. For example, 'sps-ConfigIndex' may be configured from 0 to 4 for five UE-specific SPS configurations, but 'sps-ConfigIndex' may be configured from 0 to 1 for two group common SPS configurations.

In the above option, upon receiving the DCI for the SPS configuration, the UE may check one of the following 1) to 4) without checking the 'sps-ConfigIndex' value to determine whether the SPS configuration is group common or UE specific.

1) RNTI value used for CRC scrambling of DCI

For example, when the RNTI value corresponds to a specific value such as the GC-CS-RNTI value, the SPS configuration may be group common.

DCI format of DCI

For example, when the MBS-specific DCI format is used for DCI, the SPS configuration may be group common.

3) One or more DCI fields may indicate all '0' or all '1'.

For example, when one or more of 'MCS', 'ZP CSI-RS trigger', and 'SRS request' of DCI all indicate '0', validation of DCI format for activation of group common SPS configuration may be achieved.

4) HARQ process number

For example, one SPS configuration may configure multiple HARQ process numbers up to 'nrofHARQ-Processes'. The first set of HARQ process numbers (e.g., 0, 2, 4) may be used for UE-specific SPS transmission, and the second set of HARQ process numbers (e.g., 1, 3, 5) may be used for group common SPS transmission. The UE may consider that the DL SPS resource of the slot associated with the first set is used for UE-specific SPS transmission, while the DL SPS resource of the slot associated with the second set is used for group common SPS transmission.

Alternatively, one SPS configuration may configure several HARQ process numbers up to 'nrofHARQ-Processes'. The first set of HARQ process numbers (e.g. 0, 2, 4) may be used in the first set of TMGI(s) or G-RNTI(s), but the second set of HARQ process numbers (e.g., 1, 3, 5) may be used in the second set of TMGI(s) or G-RNTI(s). The UE may consider that the DL SPS resource in the slot associated with the HARQ process number of the first set is used for SPS transmission for the TMGI or G-RNTI of the first set, but the DL SPS resource in the slot associated with the HARQ process number of the second set may be used for SPS transmission for the TMGI or G-RNTI of the second set.

If the SPS configuration is configured for the configured CFR, the UE may monitor the PDCCH in the search space (SS) configured in the configured CFR to receive the DCI in which the CRC is scrambled with the GC-CS-RNTI for activation, retransmission, or release of the SPS configuration (S920).

In step S930, for activation, retransmission, or deactivation (release) of one of the SPS configurations, the network side may transmit DCI to the UE through the PDCCH. In this case, the UE may transmit a HARQ NACK on the PUCCH to the network side for non-confirmation of the SPS configuration, and the network side may transmit a DCI back to the UE.

Then, the UE may activate the SPS configuration (e.g., SPS configuration #1) (S940). Then, the UE may transmit a HARQ-ACK for confirmation of the SPS configuration (e.g., SPS configuration #1) to the network side on the PUCCH (S950).

Specifically, the CRC of DCI may be scrambled by GC-CS-RNTI or CS-RNTI. The PDCCH may include at least one of a group common PDCCH or a UE specific PDCCH.

HARQ feedback activation/deactivation for group common SPS configuration may be indicated by (re)activation, retransmission or release DCI of SPS configuration, group common MAC CE, or UE-specific MAC CE.

MAC CE may be composed of one or more of the following information (information 1) to 4) below.

1) HARQ feedback enabling/disabling indicator for one or more G-RNTI/TMGI.

According to the indicator, the UE may enable/disable HARQ feedback for the group common PDSCH of the group common SPS configuration corresponding to G-RNTI(s)/TMGI(s).

2) HARQ feedback enable/disable indicator for one or more SPS configuration indexes.

According to the indicator, the UE may enable/disable HARQ feedback for the group common PDSCH of the group common SPS configuration(s).

3) HARQ feedback enabling/disabling indicator for one or more G-CS-RNTI/CS-RNTI.

According to the indicator, the UE may enable/disable HARQ feedback for the group common PDSCH scheduled by DCI in which CRC is scrambled by G-CS-RNTI(s)/CS-RNTI(s).

4) HARQ feedback enabling/disabling indicator for one or more PRI (PUCCH resource indicator) or one or more PUCCH resource IDs.

According to the indicator, the UE may enable/disable HARQ feedback for the group common PDSCH scheduled by DCI indicating PRI(s).

Or/and, according to the indicator, the UE may enable/disable HARQ feedback for PUCCH resource ID(s).

The MAC CE may be group common or terminal specific.

For example, when receiving a group common MAC CE for enabling/disabling HARQ feedback for the group common SPS PDSCH, the UE may enable/disable the HARQ feedback for the group common PUCCH resource for the group common SPS PDSCH according to information included in the MAC CE, and/or the UE may enable/disable HARQ feedback for any PUCCH resource for the group common SPS PDSCH according to information included in the MAC CE.

As another example, when receiving a UE-specific MAC CE for enabling/disabling HARQ feedback for the group common SPS PDSCH, the UE may enable/disable the HARQ feedback for the UE-specific PUCCH resource for the group common SPS PDSCH according to the information included in the MAC CE, and/or the UE may enable/disable HARQ feedback for any PUCCH resource for the group common SPS PDSCH according to information included in the MAC CE.

As another example, when receiving a MAC CE for enabling/disabling HARQ feedback for the group common SPS PDSCH, the UE may enable/disable HARQ feedback 1) immediately after processing the MAC CE or sending an ACK to the MAC CE, or/and 2) in the Kth slot (K is an integer determined by the network side or UE capability) after receiving the MAC CE or sending an ACK to the MAC CE, or/and 3) in the next SPS PDSCH after receiving the MAC CE or sending an ACK to the MAC CE, 4) in the next SPS retransmission after receiving the MAC CE or sending an ACK to the MAC CE.

When HARQ-ACK feedback is enabled or disabled by DCI for activating or releasing SPS configuration, DCI may allocate retransmission resources for SPS configuration, group common MAC CE, or UE-specific MAC CE.

When the enabling/disabling indicator is present in DCI, upon receiving activation/release DCI enabling HARQ-ACK feedback, the UE may transmit a (non)-confirmation to the activation/deactivation DCI. That is, the network side may expect confirmation/non-confirmation transmitted by the UE.

If an enabling/disabling indicator is present in DCI, upon receiving the activation/release DCI disabling HARQ-ACK feedback, the UE may not transmit a non-acknowledgment to the activation/release DCI. That is, the network side may expect that no confirmation/non-confirmation is transmitted by the UE.

When ACK/NACK-based HARQ-ACK feedback is configured, when receiving DCI for activating or releasing SPS configuration, UE-specific confirmation for activation/release of SPS configuration may be transmitted by ACK/NACK of UCI.

Activation/deactivation of SPS configuration DCI and PUCCH resources indicated by 'SPS-config' may be used to transmit confirmation of activation/deactivation of SPS configuration.

The same or different PUCCH resources may be used for different SPS configurations for activation/release confirmation.

i. When the same PUCCH resource is used to check the activation/deactivation of other SPS configurations, a HARQ-ACK (sub) codebook may be configured based on the SPS configuration. Other bits of the HARQ-ACK (sub) codebook may indicate confirmation or non-acknowledgment of other SPS configurations.

When different SPS configurations belong to the same SPS group, 1 bit of the HARQ-ACK (sub) codebook may indicate confirmation or non-confirmation of different SPS configurations within the same SPS group.

ii. When different PUCCH resources are used to check activation/release of different SPS configurations, separate PUCCH resources may be used to check activation/release of each SPS configuration.

When different SPS configurations belong to the same SPS group, one PUCCH resource may indicate confirmation or non-confirmation of different SPS configurations within the same SPS group.

When PUCCH-based acknowledgment for activation/deactivation is multiplexed with multicast or unicast-specific HARQ-ACK feedback, activation/release confirmation for one or more SPS configurations may be multiplexed with general multicast-specific HARQ-ACK in the first bit(s) or last bit(s) of the multicast-specific HARQ-ACK (lower) codebook.

In response to the group common SPS (de)activation DCI, HARQ ACK for UCI may be interpreted as confirmation for activation, and HARQ NACK for UCI may be interpreted as confirmation for deactivation.

In case of group common SPS, when NACK-only HARQ-ACK feedback is configured, when receiving a DCI for activating or releasing the SPS configuration, a group common or UE-specific acknowledgment for the activation/release of the SPS configuration may be transmitted by the ACK/NACK of the UCI.

Activation/deactivation of SPS configuration DCI and PUCCH resources indicated by 'SPS-config' may be used to transmit confirmation of activation/deactivation of SPS configuration.

As option 4-1, if activation/deactivation DCI is confirmed, the UE may transmit NACK for a PUCCH resource dedicated to NACK. If activation/release DCI is not confirmed, the UE may not transmit NACK for a PUCCH resource dedicated to NACK.

As option 4-2, if activation/deactivation DCI is confirmed, the UE may transmit the first sequence through PUCCH. If activation/release DCI is not confirmed, the UE may not transmit PUCCH. Alternatively, the UE may transmit the second sequence on the PUCCH.

The first sequence may be associated with SPS configuration or activation/deactivation of SPS configuration. Different first sequences may be associated with different SPS configurations.

The second sequence may be associated with SPS configuration. Different second sequences may be associated with different SPS configurations.

As option 4-3, the UE may change from NACK-based HARQ-ACK feedback to ACK/NACK-based HARQ-ACK feedback (when activation/release DCI is confirmed). In addition, the UE may transmit an acknowledgment when the ACK/NACK-based HARQ-ACK feedback is configured.

The network side may repeatedly transmit DCI indicating the same 'sps-ConfigIndex' using the same GC-CS-RNTI for activation, retransmission, or deactivation of the SPS configuration. DCI may be repeatedly transmitted in multiple CORESETs with the same or different TCI state. The network side may transmit the same DCI N times in the M-TCI state for activation, retransmission, or deactivation. N and M may be configured by the network side.

For example, the first/second repetition of DCI is transmitted in CORESET with TCI state 1, the third/fourth repetition of DCI is transmitted on CORESET with TCI state 2, and (N−1) of DCI The th/Nth repetition may be transmitted through CORESET with TCI state M. The UE may select one or two TCI states and selectively receive corresponding repetitions of DCI in the CORESET associated with the selected TCI state(s).

When DCI repetitions are transmitted in the same TCI state, the UE may transmit PUCCH based on the last repeated DCI to confirm SPS activation/deactivation. When DCI repetitions are transmitted in different TCI states, the UE may selectively receive DCI repetition(s) and transmit PUCCH based on the last repeated DCI of the selected TCI state for confirmation of SPS activation/deactivation.

The DCI may include the fields for activation, retransmission or deactivation (i.e., release) of the SPS configuration:

Identifier for DCI formats

The identifier field for the DCI format may indicate either an MBS-specific DCI format or an existing DCI format for MBS.

Carrier indicator

The carrier indicator field may indicate a (serving or MBS specific) cell of the CFR or a serving cell of the active BWP of the UE associated with the CFR. Here, the group common PDCCH/PDSCH may be transmitted or the configured DL allocation of the SPS PDSCH may be allocated to the SPS configuration indicated by the DCI.

BWP indicator

The carrier indicator field may indicate the BWP ID assigned to the CFR or the BWP ID of the active BWP of the terminal associated with the CFR. Here, a group common PDCCH/PDSCH may be transmitted or a configured DL allocation of the SPS PDSCH may be allocated to the SPS configuration indicated by the DCI.

frequency domain resource assignment time domain resource assignment

VRB-PRB mapping

PRB bundling size indicator
rate matching indicator
ZP CSI-RS trigger
modulation and coding scheme
new data indicator (NDI)

The NDI may be configured to 1 for retransmission for the SPS configuration indicated by the DCI. In addition, the NDI may be configured to 0 for activation or release (i.e., deactivation) for the SPS configuration indicated by the DCI.

redundancy version
HARQ process number
downlink assignment index
TPC command for scheduled PUCCH
PUCCH resource indicator
PDSCH-to-HARQ_feedback timing indicator
antenna port(s)
transmission configuration indicator
SRS request
DMRS sequence initialization
priority indicator The DCI (i.e., activation DCI) may indicate activation of a particular SPS configuration by using of the following options:

As option 4-1, for activation of the SPS configuration, the value of the HARQ process number field of the DCI format is the same value as provided by 'sps-ConfigIndex' of the SPS configuration, and may indicate activation of the SPS PDSCH configuration. When all RV fields for the DCI format are configured to '0', validation of the DCI format may be performed. If validity is confirmed after receiving the DCI, the UE may consider the information in the DCI format as valid activation of the DL SPS configuration. If validation is not performed, the UE may discard all information in the DCI format.

In option 4-1 above, the SPS configuration may support both a group common SPS by only GC-CS-RNTI, a UE-specific SPS by only CS-RNTI, or a group common SPS and UE-specific SPS with different HARQ process IDs or additional indications for 'group common' or 'UE-specific'.

In option 4-2, for activation of the SPS configuration, a DCI format configuration index field is added, and the configuration index field has the same value as provided by 'sps-ConfigIndex' of the SPS configuration and may indicate activation of the SPS PDSCH configuration. When the NDI fields for the DCI format are all configured to '0' (or all '1') and the RV fields for the DCI format are all configured to '0', validation of the DCI format may be achieved.

In the above option 4-2, the SPS configuration may support the group common SPS only when there is a configuration index field or support the UE-specific SPS only when there is no configuration index field.

When validation is achieved, the UE may consider the information in the DCI format as valid activation or valid release of DL SPS or configured UL grant type 2. If validation is not achieved, the UE may discard all information in DCI format.

For group common SPS, the network side, by group common or UE specific RRC message or by group common or UE specific MAC CE, may provide the UE with one or more of a service-resource mapping for an MBS service identified by TMGI or G-RNTI or GC-CS-RNTI. The data of the MBS service may be carried through the multicast traffic logical channel, that is, the MBS radio bearer (MRB) of the MTCH associated with the MBS service. The RRC message may be a group common message transmitted through a PTM multicast control channel (MCCH) or a UE-only message transmitted through a UE-specific dedicated control channel (DCCH).

If the group common DCI for the activation of the SPS configuration is not confirmed by the UE, that is, the network side cannot detect the PUCCH TX for confirmation for the active DCI or receives a non-confirmation from the UE, the network side may perform an operation according to options (options 5-1 to 5-3) to be described later.

As option 5-1, the network side may retransmit the group common DCI indicating activation of the SPS configuration until the active DCI is confirmed by the UE.

As option 5-1A, another UE that has already activated the SPS configuration may ignore the retransmitted activated DCI. That is, confirmation of the retransmitted active DCI may not be transmitted from another UE to the network side.

As option 5-1B, another UE that has already activated the SPS confirmation may re-transmit the confirmation of the retransmitted active DCI to the network side while receiving the SPS PDCCH/PDSCH transmission for the activated SPS configuration without re-activating the SPS configuration.

As option 5-1C, the other UE that has already activated the SPS confirmation may re-activate the SPS configuration (i.e., release and activate the SPS configuration) and re-transmit the confirmation to the retransmitted active DCI to the network side.

As option 5-2, the network side may provide the UE with a UE-specific DCI for activating the SPS configuration. DCI in which CRC is scrambled by UE-specific CS-RNTI or C-RNTI may indicate 'sps-ConfigIndex' of group common SPS configuration.

As option 5-3, the network side may (re)transmit the TB to the C-RNTI (i.e., PTP transmission) through the UE-specific PDSCH scheduled by DCI.

Here, the network side may retransmit a group common activated DCI (option 1) or a UE specific activated DCI (option 2). In this case, the network side may (re)transmit the TB(s) by PTP transmission until the retransmitted active DCI is confirmed by the UE.

When receiving the activation DCI indicating activation of the SPS configuration in the configured search space, the UE may activate the SPS configuration specified by 'sps-ConfigIndex'.

In addition, upon receiving the DCI, the UE may determine the MBS service(s) associated with one or more of a short ID, an MTCH ID, an MRB ID, a G-RNTI value, and a TMGI value for each SPS PDSCH occasion of the configured DL assignment, based on mapping between MBS services and the SPS configuration indicated in the DCI, mapping between MBS services and HPNs (HARQ Process Numbers) for the SPS configuration indicated in the DCI, and/or mapping between MBS services and, if available, short ID(s) indicated in the DCI.

Then, if UE is interested in the determined MBS service(s), UE may activate the SPS configuration based on the DCI indicating activation of the SPS configuration. If UE is not interested in the determined MBS service(s), UE may not activate the SPS configuration based on the DCI.

If the SPS configuration indicated by the activation DCI belongs to one SPS group which include other SPS configuration(s), upon the DCI indicating activation of the SPS configuration, UE may activate the other SPS configuration(s) belong to the same SPS group.

Alternatively, if the SPS configuration indicated by the activation DCI belongs to one SPS group which include other SPS configuration(s), upon the DCI indicating activation of the SPS configuration, UE may release the other SPS configuration that has been activated.

After activation of the SPS configuration, as shown in Equation 5 below, the UE may sequentially consider that the N-th DL allocation of the SPS PDSCH for the SPS configuration occurs in the slot.

(numberOfSlotsPerFrame×SFN+slot number in the frame)=[(numberOfSlotsPerFrame×SFNstart time+slotstart time)+N×periodicity×numberOfSlotsPerFrame/10]modulo(1024×numberOfSlotsPerFrame)   [Equation 5]

Here, the 'SFNstart' time and the 'slotstart' time may be the SFN and slot of the first transmission of the PDSCH in which the DL assignment configured for the SPS configuration was (re)initialized, respectively. The configured DL allocation may be configured as a set of periodic SPS PDSCH occasions for SPS configuration.

In the case of an SFN that is not aligned across the carriers of the cell group, the SFN of the serving cell of the active BWP of the UE related to the CFR may be used to calculate the occurrence of the configured DL assignment.

The DCI may also indicate one or more of a short ID, a MTCH ID, a MRB ID, a G-RNTI value and a TMGI value for activation of the SPS configuration.

If a data unit is available on a MTCH of a MRB for a MBS service, the base station may construct and transmit a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

If the SPS configuration has been activated by UE based on the interested MBS service, UE may periodically receive SPS PDSCH transmission occasions on the configured downlink assignment for the SPS configuration according to the above equation (S960). UE may consider the NDI to have been toggled for reception of each of the SPS PDSCH occasions.

For reception of a specific SPS PDSCH transmission occasion on the configured downlink assignment for the SPS configuration, UE may consider that the SPS PDCH transmission occasion is associated to MTCH, MRB, TMGI, G-RNTI and/or short ID of the MBS service based on mapping between MBS services and the SPS configuration, mapping between MBS services and HPNs (HARQ Process Numbers) for the SPS configuration, and/or mapping between MBS services and, if available, short ID(s), as indicated in the activation DCI or the retransmission DCI and/or configured by the RRC message.

If decoding the TB on the SPS PDSCH transmission occasion is unsuccessful, the UE may transmit HARQ NACK to the base station on a PUCCH resource in the configured UL CFR according to PUCCH configuration of the SPS configuration received by the RRC message, and PUCCH resource indicator and PDSCH-to-HARQ feedback timing indicator received by the DCI activating the SPS configuration.

By using the same PUCCH resource, the UE also may transmit HARQ-ACK to other PDSCH transmissions such as unicast SPS PDSCH, dynamic unicast PDSCH, PTP retransmission and/or dynamic group common PDSCH (S970).

In this case, the UE may determine PUCCH resources for multiplexing unicast (i.e., UE-specific data transmission) and/or multicast (i.e., group common data transmission) as follows.

PUCCH resources may be determined based on the total payload size of unicast/multicast HARQ-ACK(s).

When NACK only HARQ-ACK is configured for PUCCH resources, NACK only HARQ-ACK may be changed to ACK/NACK-based HARQ-ACK in order to multiplex with unicast.

Alternatively, NACK-only HARQ-ACKs may be dropped, delayed, or prioritized.

Each option to be described later may vary depending on whether 'PUCCH-config' is configured for multicast.

The unicast PDSCH may correspond to one of non-MBS data transmission, MBS PTP data transmission, and group common SPS retransmission scheduled by the group common DCI in which the CRC is scrambled by the G-CS-RNTI.

Alternatively, one or both of MBS PTP data transmission and group common SPS retransmission may belong to a group common PDSCH (or multicast PDSCH) rather than a unicast PDSCH.

SPS PDSCH may be transmitted without PDCCH. SPS PDSCH may be scheduled by RRC rather than DCI.

The group common PDSCH may be replaced with a multicast PDSCH.

Example 1: When PUCCH(s) for unicast SPS PDSCH(s) and PUCCH(s) for group common PDSCH(s) scheduled by DCI(s) indicating PRI are allocated to the same slot, PUCCH resources for all PDSCHs may be determined based on one or more options below.

Option 1: PUCCH resources may be determined based on the PRI indicated in the last received DCI scheduling group common PDSCH.

Option 1 may be applied only when 'PUCCH-config' for multicast is configured.

Alternatively, in option 1, regardless of whether 'PUCCH-config' for multicast is not configured or whether 'PUCCH-config' for multicast is configured, PUCCH resources may be determined based on 'PUCCH-config' for unicast.

Option 2: The UE may determine a PUCCH resource configured for SPS configuration of unicast SPS PDSCH(s). When multiple SPS configurations are configured for unicast, PUCCH resources may be determined based on PUCCH resources configured for the lowest (or highest) SPS configuration index.

Option 3: The UE may determine a PUCCH resource configured for HP from among unicast PDSCH(s) and group common PDSCH(s).

For example, when the unicast PDSCH has HP, the UE may determine the PUCCH resource according to option 2. When the group common PDSCH has HP, the UE may determine the PUCCH resource according to option 1.

Option 4: The UE may determine a PUCCH resource configured with a larger supportable payload size/PRB/symbol among PUCCH resources for unicast PDSCH (s) and group common PDSCH (s).

Option 5: The UE may determine a PUCCH resource configured in a specific PUCCH format among PUCCH resources for unicast PDSCH(s) and group common PDSCH(s). For example, the UE may determine a PUCCH resource composed of a specific PUCCH format supporting MBS or a long PUCCH format.

Option 6: The UE may determine a PUCCH resource configured with the lowest (or highest) PUCCH resource ID among all PUCCHs for unicast, multicast, or both unicast and multicast.

Alternatively, the UE may determine the PUCCH resource indicated by the lowest (or highest) PRI value among all received DCIs.

Example 2: When PUCCH(s) for unicast PDSCH(s) scheduled by DCI(s) indicating PRI and PUCCH(s) for group common SPS PDSCH(s) are allocated to the same slot, PUCCH resources for all PDSCHs may be determined based on one or more of the following options.

Option 1: PUCCH resources may be determined based on the PRI indicated in the last received DCI scheduling unicast PDSCH.

Option 2: The UE may determine a PUCCH resource configured for SPS configuration of group common SPS PDSCH (s). When multiple SPS configurations are configured for multicast, PUCCH resources may be determined based on PUCCH resources configured for the lowest (or highest) SPS configuration index.

Option 3: The UE may determine a PUCCH resource configured for HP from among unicast PDSCH(s) and group common PDSCH(s).

For example, when the unicast PDSCH has HP, the UE may determine the PUCCH resource according to option 1. If the group common PDSCH is owned by HP, the UE may determine the PUCCH resource according to option 2.

Option 4: The UE may determine a PUCCH resource configured with a larger supportable payload size/PRB/symbol among PUCCH resources for unicast PDSCH (s) and group common PDSCH (s).

Option 5: The UE may determine a PUCCH resource configured in a specific PUCCH format among PUCCH resources for unicast PDSCH(s) and group common PDSCH(s). For example, the UE may determine a PUCCH resource composed of a specific PUCCH format supporting MBS or a long PUCCH format.

Option 6: The UE may determine a PUCCH resource configured with the lowest (or highest) PUCCH resource ID among all PUCCHs for unicast, multicast, or both unicast and multicast.

Alternatively, the UE may determine the PUCCH resource indicated by the lowest (or highest) PRI value among all received DCIs.

Example 3: When PUCCH(s) for unicast SPS PDSCH(s) and PUCCH(s) for group common SPS PDSCH(s) are allocated to the same slot, PUCCH resources for all PDSCHs may be determined based on one or more of the following options.

Option 1: The UE may determine the PUCCH resource based on the PUCCH resource configured for the lowest (or highest) SPS configuration index. In this case, the SPS configuration index may be shared in unicast SPS configuration and group common SPS configuration.

Option 2: The UE may determine a PUCCH resource configured for SPS configuration of unicast SPS PDSCH(s). When multiple SPS configurations are configured for unicast, PUCCH resources may be determined based on PUCCH resources configured for the lowest (or highest) SPS configuration index.

Option 3: The UE may determine a PUCCH resource configured for HP from among unicast PDSCH(s) and group common PDSCH(s).

When several SPS configurations have HP, the UE may determine PUCCH resources based on one or more other options.

Option 4: The UE may determine a PUCCH resource composed of a larger supportable payload size/PRB/symbol among PUCCH resources for unicast PDSCH (s) and group common PDSCH (s).

Option 5: The UE may determine a PUCCH resource configured in a specific PUCCH format among PUCCH resources for unicast PDSCH(s) and group common PDSCH(s). For example, the UE may determine a PUCCH resource composed of a specific PUCCH format supporting MBS or a long PUCCH format.

Option 6: The UE may determine a PUCCH resource configured with the lowest (or highest) PUCCH resource ID among all PUCCHs configured for unicast, multicast, or all SPS configurations for unicast and multicast.

When PUCCH(s) for unicast PDSCH(s) scheduled by DCI(s) indicating PRI and PUCCH(s) for group common PDSCH(s) scheduled by DCI(s) indicating PRI are equally allocated, PUCCH resources for all PDSCHs in a slot may be determined according to one or more options below.

Option 1: The PUCCH resource may be determined based on the PRI indicated in the last received DCI scheduling unicast PDSCH or group common PDSCH.

Option 1 may be applied only when 'PUCCH-config' for multicast or 'PUCCH-config' for unicast is configured.

Alternatively, when PUCCH-config for multicast is not configured in option 1 or regardless of whether PUCCH-config for multicast is configured, PUCCH resources may be determined based on 'PUCCH-config' for unicast.

Option 2: PUCCH resources may be determined based on the PRI indicated in the last received DCI scheduling unicast PDSCH.

Option 2 may be applied only when 'PUCCH-config' for multicast is not configured, that is, when 'PUCCH-config' for unicast is configured.

Option 1 may be applied only when 'PUCCH-config' for multicast is configured.

In the above option, when 'PUCCH-config' for multicast is not configured or regardless of whether 'PUCCH-config' is configured for multicast, PUCCH resources may be determined based on 'PUCCH-config' for unicast.

Option 3: The UE may determine the PUCCH resource configured for HP among unicast PDSCH(s) and group common PDSCH(s).

For example, when the unicast PDSCH has HP, the UE may determine the PUCCH resource based on the PRI indicated in the last received DCI scheduling unicast PDSCH. If the group common PDSCH has HP, the UE may determine the PUCCH resource based on the PRI indicated in the last received DCI scheduling group common PDSCH or the PRI indicated in the last received DCI scheduling group common PDSCH or unicast PDSCH.

Option 4: The UE may determine a PUCCH resource composed of a larger supportable payload size/PRB/symbol among PUCCH resources for unicast PDSCH (s) and group common PDSCH (s).

Option 5: The UE may determine a PUCCH resource configured in a specific PUCCH format among PUCCH resources for unicast PDSCH(s) and group common PDSCH(s). For example, the UE may determine a PUCCH resource composed of a specific PUCCH format supporting MBS or a long PUCCH format.

Option 6: The UE may determine a PUCCH resource configured with the lowest (or highest) PUCCH resource ID among all PUCCHs for unicast, multicast, or both unicast and multicast.

Alternatively, the UE may determine a PUCCH resource indicated by the lowest (or highest) PRI value of all received DCIs (or the last DCI scheduling unicast PDSCH and the last DCI scheduling group common PDSCH).

Example 5: When PUCCHs for group common PDSCHs scheduled by DCI indicating PRI are allocated to the same slot, PUCCH resources for all PDSCHs may be determined based on one or more of the following options.

Option 1: PUCCH resources may be determined based on the PRI indicated in the last received DCI scheduling group common PDSCH.

The option may be applied regardless of whether 'PUCCH-config' for multicast is configured, whether PUCCH-config for unicast is configured, or whether PUCCH-config for multicast is configured.

Option 3: The UE may determine the PUCCH resource configured for the HP among the group common PDSCH (s).

For example, the UE may determine the PUCCH resource based on the PRI indicated in the common PDSCH of the last received DCI scheduling group corresponding to the HP.

Option 4: The UE may determine a PUCCH resource composed of a larger supportable payload size/PRB/symbol among PUCCH resources for group common PDSCH (s).

Option 5: The UE may determine a PUCCH resource configured in a specific PUCCH format among PUCCH resources for group common PDSCH (s). For example, the UE may determine a PUCCH resource composed of a specific PUCCH format supporting MBS or a long PUCCH format.

Option 6: The UE may determine a PUCCH resource composed of the lowest (or highest) PUCCH resource ID among all PUCCHs.

Alternatively, the UE may determine the PUCCH resource indicated by the lowest (or highest) PRI value among all received DCIs.

Example 6: When a PUCCH for a group common PDSCH scheduled by a DCI indicating PRI and a PUCCH for a group common SPS PDSCH are allocated to the same slot, PUCCH resources for all PDSCHs may be determined according to one or more options below.

Option 1: PUCCH resources may be determined based on the PRI indicated in the last received DCI scheduling group common PDSCH.

The following options may be applied regardless of whether 'PUCCH-config' for multicast is configured, when 'PUCCH-config' for unicast is configured, or whether 'PUCCH-config' for multicast is configured.

Option 2: The UE may determine a PUCCH resource configured for SPS configuration of group common SPS PDSCH (s). When multiple SPS configurations for multicast are configured, PUCCH resources may be determined based on PUCCH resources configured for the lowest (or highest) SPS configuration index.

Option 3: The UE may determine the PUCCH resource configured for the HP among the group common PDSCH (s).

For example, when several SPS configurations are configured in HP, PUCCH resources may be determined based on PUCCH resources configured for the lowest (or highest) SPS configuration index among SPS configurations.

Option 4: The UE may determine a PUCCH resource composed of a larger supportable payload size/PRB/symbol among PUCCH resources for unicast PDSCH (s) and group common PDSCH (s).

Option 5: The UE may determine a PUCCH resource configured in a specific PUCCH format among PUCCH resources for group common PDSCH (s). For example, the UE may determine a PUCCH resource composed of a specific PUCCH format supporting MBS or a long PUCCH format.

Option 6: The UE may determine a PUCCH resource composed of the lowest (or highest) PUCCH resource ID among all PUCCHs.

Alternatively, the UE may determine the PUCCH resource indicated by the lowest (or highest) PRI value among all received DCIs.

Example 7: When PUCCHs for group common SPS PDSCHs are allocated to the same slot (and unicast SPS is not configured or activated), PUCCH resources for all PDSCHs may be determined based on one or more options below.

Option 1: The UE may determine the PUCCH resource based on the PUCCH resource configured for the lowest (or highest) SPS configuration index.

Option 2: The UE may determine a PUCCH resource configured for SPS configuration of group common SPS PDSCH (s). When multiple SPS configurations are configured for multicast, PUCCH resources may be determined based on PUCCH resources configured for the lowest (or highest) SPS configuration index.

Option 3: The UE may determine the PUCCH resource configured for the HP among the group common PDSCH (s).

When several SPS configurations have HP, the UE may determine PUCCH resources based on one or more of the other options.

Option 4: The UE may determine a PUCCH resource composed of a larger supportable payload size/PRB/symbol among PUCCH resources for group common PDSCH (s).

Option 5: The UE may determine a PUCCH resource configured in a specific PUCCH format among PUCCH resources for group common PDSCH (s). For example, the UE may determine a PUCCH resource composed of a specific PUCCH format supporting MBS or a long PUCCH format.

Option 6: The UE may determine a PUCCH resource configured with the lowest (or highest) PUCCH resource ID among all PUCCHs configured for all SPS configurations.

Upon receiving the HARQ-ACK(s) with the TCI state, the network side may transmit PDCCH and PDSCH with the TCI status in the DL CFR configured for TB retransmission. The UE may monitor the group common and/or UE specific PDCCH as the TCI state for the search space configured in the DL CFR to receive the TB retransmission.

The PDCCH for allocating retransmission resources for SPS configuration may be a group common PDCCH or a UE specific PDCCH regardless of whether the SPS configuration is activated by the group common PDCCH or the UE specific PDCCH.

For example, after activating SPS configurations for a group of UEs, the network side may retransmit the TB of the SPS configuration only for one of the UEs in the group by the UE-specific PDCCH, but the other UE may not receive the TB retransmission for the SPS (because it successfully received the TB).

For retransmission of the activated SPS configuration, the network side may transmit DCI to the UE through the PDCCH. The CRC of DCI can be scrambled to one of GC-CS-RNTI, CS-RNTI, G-RNTI and C-RNTI.

In order to decode the TB on the SPS PDSCH transmission occasion, the UE may consider that the TB is associated with the short ID of the MTCH, MRB, TMGI, G-RNTI and/or MBS service, based on the mapping between the MBS service and the SPS configuration, the mapping between the MBS service and the HPN (HARQ process number) for the SPS configuration, and/or the mapping between the MBS services, and the short ID(s) indicated in the DCI if available.

Upon receiving the PDCCH for retransmission of the TB, the UE may receive the PDSCH scheduled by the DCI of the PDCCH.

If the TB on the PDSCH is successfully decoded, if possible, the UE may consider that the short ID(s) decoded TB is associated with the MTCH, MRB, TMGI, G-RNTI and/or short ID of the MBS service, based on the mapping between the MBS service and the SPS configuration, the mapping between the MBS service and the HPN (HARQ process number) for the SPS configuration, and/or the mapping between the MBS services, as indicated in the activation DCI or retransmission DCI and/or as configured by the RRC message.

If TB decoding is successful during SPS PDSCH transmission, the UE may transmit HARQ ACK(s) to the network side through the PUCCH configuration of SPS configuration received by RRC message, PUCCH resource indicator received by the retransmission DCI, and PUCCH resource of UL CFR configured according to 'PDSCH-to-HARQ_feedback' timing indicator.

Since the method for determining the PUCCH resource for the HARQ-ACK has been described above, duplicate descriptions will be omitted.

When the network side changes the mapping between the MBS service and the SPS configuration, the mapping between the MBS service and the HPN (HARQ process number) for the SPS configuration, and/or the mapping between the MBS services, short ID(s) if possible, indicated by the network side on the activation DCI or retransmission DCI and/or configured by the RRC message, the network side may re-activate the SPS configuration.

For example, if the SPS configuration is activated for the first MBS service by transmitting an activation DCI indicating the first MBS service, and the network side changes the SPS configuration mapping from the first MBS service to the second MBS service, the network side may reactivate the SPS configuration by transmitting an activation DCI indicating the second MBS service. For example, the reactivation DCI may indicate a short ID associated with the second MBS service or a G-RNTI/TMGI of the second MBS service. Upon receiving the reactivation DCI, the UE may consider that the SPS configuration is remapped to the second MBS service (and not mapped to the first MBS service).

For example, when the SPS configuration is activated for the first MBS service by transmitting an activation DCI indicating the first MBS service, and the network side adds the mapping of the second MBS service to the SPS configuration in addition to the first MBS service, the network side may reactivate the SPS configuration by transmitting an activation DCI indicating the second MBS service. For example, the reactivation DCI may indicate a short ID associated with the second MBS service or a G-RNTI/TMGI of the second MBS service. Upon receiving the reactivation DCI, the UE may consider that the SPS configuration is mapped not only to the first MBS service but also to the second MBS service.

If the PDCCH/PDSCH of the activated SPS configuration collides with other transmission/reception, the high priority of the PDCCH/PDSCH of the activated SPS configuration may ignore other transmission/reception, and other transmission/reception may ignore the low priority of the PDCCH/PDSCH of the activated SPS configuration.

If the PUCCH/PUSCH for the activated SPS configuration collides with other transmission and reception, the high priority of PUCCH/PUSCH of the activated SPS configuration may ignore other transmission/reception, and other transmission/reception may ignore the low priority of PUCCH/PUSCH of the activated SPS configuration.

The priority may be determined as follows.

As option 15-1, activation or retransmission or release DCI with GC-CS-RNTI or CS-RNTI may indicate high priority or low priority for SPS configuration.

As option 15-2, a high priority or a low priority may be configured for each SPS configuration by the RRC.

As option 15-3, for each RNTI value used to activate the SPS configuration by the RRC, a high priority or a low priority may be configured. The RNTI may be one of G-RNTI, CS-RNTI and GC-CS-RNTI.

When the SPS configuration is configured on the network side, the group common SPS configuration may be implicitly released.

As option 16-1, after activation of SPS configuration symbol/slot receiving DCI or symbol/slot receiving PDCCH/PDSCH transmission of SPS configuration, the SPS configuration may be released in N cycles. N may be configured by RRC or DCI activating the SPS configuration.

For example, in case of SPS configuration, the activation DCI received in the last Nth period of the group common SPS may reactivate the group common SPS immediately after the end of the Nth periodicity, that is, at the start of the (N+1)th periodicity.

As another example, in the case of SPS configuration, the network side may transmit DCI indicating explicit release of SPS configuration (e.g., in the middle of N periods of SPS configuration).

As option 16-2, the SPS configuration may be released when the timer expires. The timer may (re)start after a symbol/slot in which the activation DCI of the SPS configuration is received or a symbol/slot in which the PDCCH/PDSCH transmission of the SPS configuration is received. The timer value may be (re)configured by RRC or DCI that activates the SPS configuration.

As option 16-3, when UCI transmits Nth HARQ NACK for SPS configuration, the UE may release SPS configuration and notify the network side of SPS configuration release by UCI or MAC CE.

As option 16-4, after activation of the group common SPS, all UEs may autonomously release the group common SPS immediately after the predetermined slot as long as the activation DCI indicating the SPS is not received until the predetermined slot.

Here, the activation DCI or the retransmission DCI may reactivate the group common SPS immediately after a predetermined time. The predetermined time may be determined by RRC and/or DCI.

An activation DCI or retransmit DCI received after automatic SPS release may immediately reactivate the group common SPS.

Alternatively, the activation DCI or retransmission DCI received after automatic SPS release may activate the group common SPS immediately after a predetermined time. The predetermined time may be determined by an RRC message and/or DCI.

An RRC message or DCI may indicate immediate activation or delayed activation at a predetermined time.

For deactivation of the SPS configuration, the network side may transmit DCI to the UE through the PDCCH. CRC of DCI may be scrambled by either GC-CS-RNTI or CS-RNTI. The PDCCH for the DCI indicating deactivation of the SPS configuration may be a group common PDCCH or a UE specific PDCCH regardless of whether the SPS configuration is activated by the group common PDCCH or the UE specific PDCCH.

For example, after activating the SPS configuration for the UE group, the network side may deactivate the SPS configuration for only one of the UEs of the group by the UE-specific PDCCH, and the other UE may still activate the SPS configuration.

Deactivation/Release DCI may indicate deactivation/release of SPS configurations using the following options.

As option 17-1, when 'sps-ConfigDeactivationStateList' is provided to the UE, the HARQ process number field value of the DCI format may indicate a corresponding entry for de-scheduling of one or more SPS PDSCH configurations.

As option 17-2, if 'sps-ConfigDeactivationStateList' is not provided to the UE, the value of the HARQ process number field of the DCI format may indicate the configuration of the SPS PDSCH having the same value provided by each of 'ConfiguredGrantConfigIndex' or 'sps-ConfigIndex' or release of the corresponding UL grant type 2 PUSCH.

If the group common DCI for the release of the SPS configuration is not confirmed by the UE, that is, the network side cannot detect the PUCCH TX for confirmation for the release DCI or receives a non-confirmation, it may operate like option 17A or option 17B, which will be described later.

As option 17A, the network side may retransmit the group common DCI indicating the release of the SPS configuration until the release DCI is confirmed by the UE.

As option 17A-1, another UE that has already released the SPS configuration may ignore the retransmitted release DCI. That is, the confirmation for the retransmitted release DCI may not be transmitted.

As option 17A-2, the other UE that has already released the SPS confirmation may re-transmit the confirmation for the retransmitted release DCI to the network side while the SPS configuration is released, without releasing the SPS configuration again.

As option 17B, the network side may provide the UE with a UE-specific DCI for releasing the SPS configuration. DCI in which CRC is scrambled by UE-specific CS-RNTI or C-RNTI may indicate 'sps-ConfigIndex' of group common SPS configuration.

In step S980, The network side may transmit deactivation/release DCI for the activated SPS configuration (e.g., SPS configuration #1) to the UE, and the UE may transmit a HARQ-ACK (or HARQ-NACK) for non-confirmation (or confirmation) of the SPS configuration (e.g., SPS configuration #1) on the PUCCH to the network side.

And, in step S990, when the UE transmits the HARQ-ACK for non-confirmation of the SPS configuration (e.g., SPS configuration #1) on the PUCCH to the network side, the network side may again transmit the deactivation/release DCI for the SPS configuration (e.g., SPS configuration #1) to the UE, and the UE may transmit a HARQ-NACK for confirmation of the SPS configuration (e.g., SPS configuration #1) to the network side on the PUCCH having the TCI state 1.

Specifically, upon receiving the deactivation/release DCI for the activated SPS configuration, the UE may deactivate/release the SPS configuration and all configurations related to the SPS configuration.

If the SPS configuration indicated by the release DCI belongs to one SPS group including other SPS configuration(s), according to the DCI instructing release of the SPS configuration, the UE may release other SPS configuration(s) belonging to the same SPS group.

Alternatively, if the SPS configuration indicated by the release DCI belongs to one SPS group including other SPS configuration(s), upon receiving the DCI indicating release of the SPS configuration, the UE may activate another activated SPS configuration.

General Device to which the Present Disclosure May be Applied

Figure 10:
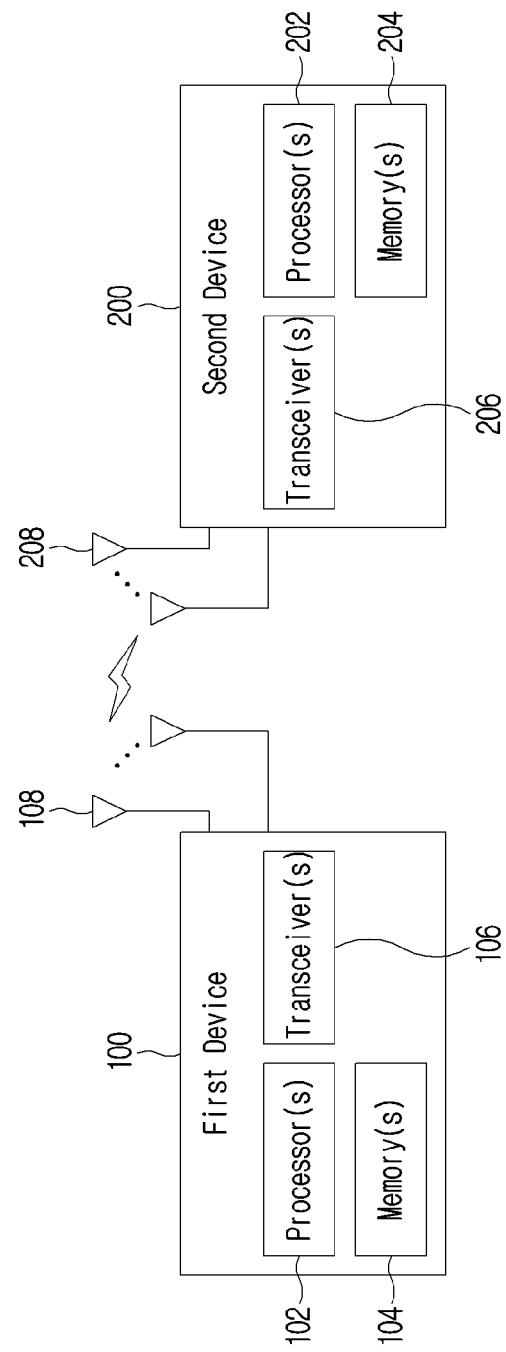
FIG. 10 illustrates a block diagram of a wireless communication system according to an embodiment of the present disclosure.

FIG. 10 illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202.

For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a user equipment (UE) in a wireless communication system, the method comprising:
    performing first physical downlink shared channel (PDSCH) reception and second PDSCH reception; and
    transmitting, to a base station, first hybrid automatic repeat request (HARQ)-acknowledgement (ACK) information associated with the first PDSCH reception and second HARQ-ACK information associated with the second downlink PDSCH reception multiplexed on a physical uplink control channel (PUCCH),
    wherein, based on the first PDSCH reception being a unicast semi-persistent scheduling (SPS) PDSCH reception and the second PDSCH reception being a multicast PDSCH reception scheduled by first downlink control information (DCI), a resource for the PUCCH is determined based on information related to the unicast SPS PDSCH reception received through a radio resource control (RRC) signaling,
    wherein, based on the first PDSCH reception being a multicast SPS PDSCH reception and the second PDSCH reception being a multicast PDSCH reception scheduled by the first DCI, a resource for the PUCCH is determined based on a last DCI, and
    wherein based on the first PDSCH reception being the unicast SPS PDSCH reception and the second PDSCH reception being the multicast SPS PDSCH reception, a resource for the PUCCH is determined based on at least one PUCCH resource for HARQ-ACK of the unicast SPS PDSCH reception.

2. The method of claim 1, wherein:
    the information related to the unicast SPS PDSCH reception includes information related to at least one PUCCH resource for HARQ-ACK of the unicast SPS PDSCH reception.

3. The method of claim 1, wherein:
    the resource for the PUCCH includes a resource indicated by a PUCCH resource indicator (PRI) of the last DCI.

4. A user equipment (UE) in a wireless communication system, the UE comprising:
    at least one transceiver; and
    at least one processor coupled to the at least one transceiver;
    wherein the at least one processor is configured to:
    perform first physical downlink shared channel (PDSCH) reception and second PDSCH reception; and
    transmit, to the base station through the at least one transceiver, first hybrid automatic repeat request (HARQ)-acknowledgement (ACK) information associated with the first PDSCH reception and second HARQ-ACK information associated with the second PDSCH reception multiplexed on a physical uplink control channel (PUCCH),
    wherein, based on the first PDSCH reception being a unicast semi-persistent scheduling (SPS) PDSCH reception and the second PDSCH reception being a multicast PDSCH reception scheduled by first downlink control information (DCI), a resource for the PUCCH is determined based on information related to the unicast SPS PDSCH reception received through a radio resource control (RRC) signaling, wherein, based on the first PDSCH reception being a multicast SPS PDSCH reception and the second PDSCH reception being a multicast PDSCH reception scheduled by the first DCI, a resource for the PUCCH is determined based on a last DCI, and wherein based on the first PDSCH reception being the unicast SPS PDSCH reception and the second PDSCH reception being the multicast SPS PDSCH reception, a resource for the PUCCH is determined based on at least one PUCCH resource for HARQ-ACK of the unicast SPS PDSCH reception.

5. A base station in a wireless communication system, the base station comprising:

at least one transceiver; and at least one processor coupled to the at least one transceiver;

wherein the at least one processor is configured to:

perform, to a user equipment (UE) through the at least one transceiver, first physical downlink shared channel (PDSCH) transmission and second PDSCH transmission; and receive, from the UE through the at least one transceiver, first hybrid automatic repeat request (HARQ)-acknowledgement (ACK) information associated with the first PDSCH transmission and second HARQ-ACK information associated with the second PDSCH transmission multiplexed on a physical uplink control channel (PUCCH), wherein, based on the first PDSCH reception being a unicast semi-persistent scheduling (SPS) PDSCH reception and the second PDSCH reception being a multicast PDSCH reception scheduled by first downlink control information (DCI), a resource for the PUCCH is determined based on information related to the unicast SPS PDSCH reception received through a radio resource control (RRC) signaling, wherein, based on the first PDSCH reception being a multicast SPS PDSCH reception and the second PDSCH reception being a multicast PDSCH reception scheduled by the first DCI, a resource for the PUCCH is determined based on a last DCI, and wherein based on the first PDSCH reception being the unicast SPS PDSCH reception and the second PDSCH reception being the multicast SPS PDSCH reception, a resource for the PUCCH is determined based on at least one PUCCH resource for HARQ-ACK of the unicast SPS PDSCH reception.

* * * * *